United States Patent
Barish

(10) Patent No.: US 11,393,119 B2
(45) Date of Patent: Jul. 19, 2022

(54) METHODS FOR CALCULATING REAL TIME PACKAGE DENSITY

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 168 days.

(21) Appl. No.: 16/905,606

(22) Filed: Jun. 18, 2020

(65) Prior Publication Data
US 2021/0398308 A1    Dec. 23, 2021

(51) Int. Cl.
  *G06T 5/00* (2006.01)
  *G06T 5/20* (2006.01)
  (Continued)

(52) U.S. Cl.
  CPC .............. *G06T 7/62* (2017.01); *G06T 5/002* (2013.01); *G06T 5/20* (2013.01); *G06T 7/11* (2017.01);
  (Continued)

(58) Field of Classification Search
  CPC ... G06T 5/002; G06T 5/20; G06T 7/11; G06T 7/55; G06T 7/62; G06T 2200/04; G06T 2207/10024; G06T 2207/10048
  See application file for complete search history.

(56) References Cited

U.S. PATENT DOCUMENTS 9,142,035 B1 * 9/2015 Rotman ............... G06V 10/42
10,268,892 B1 * 4/2019 Miller ................. G06Q 10/083
(Continued)

FOREIGN PATENT DOCUMENTS

BE    1025929 B1 * 1/2020 ............ B65D 90/48
CA    2967025 C * 6/2018 ......... G06K 9/00201
(Continued)

OTHER PUBLICATIONS

Föcker et al. ("Real-time cargo vol. recognition using internet-connected 3D scanners," International Conference on Evaluation of Novel Approaches to Software Engineering; Date of Conference: Apr. 29-30, 2015) (Year: 2015).*

(Continued)

*Primary Examiner* — Yubin Hung
(74) *Attorney, Agent, or Firm* — Yuri Astvatsaturov

(57) ABSTRACT

Methods and systems for assessing a unit load device (ULD) package density are disclosed herein. An example method includes capturing a primary and secondary image featuring the ULD. The method further includes segmenting the primary image and the secondary image into a plurality of subsections and determining a primary largest depth value and secondary largest depth value for each subsection. The method further includes determining a depth change by comparing the primary largest depth value for each subsection to the secondary largest depth value for each subsection. The method further includes clustering subsections in the secondary image including a respective secondary largest depth value that is substantially similar to a subsection corresponding to a depth change to create a plurality of clusters. The method further includes calculating a wasted volume, and calculating a ULD package density by subtracting the wasted volume from a filled volume of the ULD.

20 Claims, 7 Drawing Sheets

(51) Int. Cl.
*G06T 7/11* (2017.01)
*G06T 7/55* (2017.01)
*G06T 7/62* (2017.01)

(52) U.S. Cl.
CPC ............ *G06T 7/55* (2017.01); *G06T 2200/04* (2013.01); *G06T 2207/10024* (2013.01); *G06T 2207/10048* (2013.01)

(56) References Cited

U.S. PATENT DOCUMENTS

| | | | |
|---|---|---|---|
| 10,460,464 B1* | 10/2019 | Hasan | G06F 16/951 |
| 2019/0197455 A1* | 6/2019 | Krishnamurthy | ............................ G06Q 10/06393 |
| 2020/0013011 A1* | 1/2020 | Kashi | G06T 7/62 |

FOREIGN PATENT DOCUMENTS

| | | | | |
|---|---|---|---|---|
| CN | 110349204 A | * | 10/2019 | |
| DE | 102014011821 A1 | * | 2/2016 | ............. G01B 11/00 |

OTHER PUBLICATIONS

Amorim et al. ("Simple and Effective Load Volume Estimation in Moving Trucks using LiDARs," 32nd SIBGRAPI Conference on Graphics, Patterns and Images; Date of Conference: Oct. 28-30, 2019) (Year: 2019).*

* cited by examiner

METHODS FOR CALCULATING REAL TIME PACKAGE DENSITY

BACKGROUND

In commercial shipping via airplanes, packages are loaded into containers called unit load devices (ULDs). Typically, load monitoring units (LMUs) or other devices capture images of the ULDs during loading to track loading progress. More recently, LMUs also perform real-time analytics using the ULD images to actively assess various aspects of the loading procedure, such as package density. Shipping companies increasingly rely on LMU package density analytics to determine the efficiency of their packing/unpacking procedures. Moreover, package density analytics typically inform loaders and other personnel when a loading session is considered complete, and when a container may be loaded for transport. Correspondingly, a major point of emphasis in the shipping industry is ensuring that LMUs perform high-fidelity, real-time package density analytics during ULD loading sessions.

Presently, no method exists for assessing the real-time package density within a ULD when the packages are not loaded in a manner sufficient to fill most wasted space within the ULD. Instead, loaders manually scan a barcode on the side of each package which provides a gross volume of packages loaded into the ULD. The loader typically then scans a barcode on the side of the ULD to provide the volume of the ULD to complete the approximate density calculation. Unfortunately, these traditional methods typically require package feed integration and suffer from a lack of real-time package scans. As a result, traditional methods consistently fail to provide accurate, real-time package density measurements.

Thus, there is a need for imaging systems and methods for ULD package density determination that allow for fast, efficient, and accurate real-time ULD package density assessments for ULD load point analytics.

SUMMARY

In an embodiment, the present invention is a method for assessing a unit load device (ULD) package density. The method includes capturing a primary image featuring the ULD and a secondary image featuring the ULD, wherein the primary image and the secondary image include a plurality of three-dimensional (3D) image data. The method further includes segmenting the primary image and the secondary image into a plurality of subsections. The method further includes determining a primary largest depth value for each subsection by evaluating a depth value of all 3D image data included in each respective subsection of the primary image. The method further includes determining a secondary largest depth value for each subsection by evaluating the depth value of all 3D image data included in each respective subsection of the secondary image. The method further includes determining a depth change by comparing the primary largest depth value for each subsection to the secondary largest depth value for each subsection. The method further includes clustering subsections in the secondary image including a respective secondary largest depth value that is substantially similar to a respective secondary largest depth value of a subsection that corresponds to a respective depth change to create a plurality of clusters; calculating a wasted volume by multiplying a sum of respective depth values corresponding to respective clusters to an area value corresponding to each subsection; and calculating a ULD package density by subtracting the wasted volume from a filled volume of the ULD.

In a variation of this embodiment, the method further comprises retrieving, for each subsection in each cluster, the depth value in the primary image; storing a smallest depth value for each cluster in the primary image; and calculating a wasted space value by subtracting the depth value for each subsection within each respective cluster from the smallest depth value corresponding to the respective cluster.

In another variation of this embodiment, the respective depth value corresponding to the respective cluster is the wasted space value for the respective cluster, and the area value corresponding to each subsection is based on a height and a width of each subsection.

In yet another variation of this embodiment, the method further comprises applying a filter to the secondary image to remove pixilation from the secondary image, wherein the filter includes one or more of (i) a median filter or (ii) a Gaussian filter.

In still another variation of this embodiment, clustering subsections further comprises applying a search-based algorithm including one or more of (i) a depth first search (DFS) or (ii) a breadth first search (BFS).

In yet another variation of this embodiment, the method further comprises capturing a tertiary image featuring the ULD, wherein the tertiary image includes at least one of (i) an infrared (IR) image or (ii) a red-green-blue (RGB) image; and analyzing the tertiary image to identify an erroneously clustered subsection.

In still another variation of this embodiment, the secondary image is captured a duration D after capturing the primary image, and the method further comprises: (a) designating the secondary image as a prior image; (b) capturing a subsequent image featuring the ULD the duration D after capturing the prior image; (c) designating the subsequent image as a current image; (d) calculating the ULD package density by comparing the current image to the prior image; (e) designating the current image as the prior image; and (f) iteratively performing steps (b)-(f) until at least one of (i) the ULD package density exceeds a package density threshold or (ii) the ULD package density fails to increase between subsequent iterations of steps (b)-(f) for more than a threshold iteration count.

In yet another variation of this embodiment, the method further comprises calculating the filled volume of the ULD by multiplying a fullness estimation with a known volume of the ULD.

In another embodiment, the present invention is a system for assessing a unit load device (ULD) package density. The system includes a housing and an imaging assembly at least partially within the housing. The imaging assembly is configured to capture a primary image featuring the ULD and a secondary image featuring the ULD, wherein the primary image and the secondary image include a plurality of three-dimensional (3D) image data. The system further includes one or more processors and a non-transitory computer-readable memory coupled to the imaging assembly and the one or more processors. The memory stores instructions thereon that, when executed by the one or more processors, cause the one or more processors to: segment the primary image and the secondary image into a plurality of subsections, determine a primary largest depth value for each subsection by evaluating a depth value of all 3D image data included in each respective subsection of the primary image, determine a secondary largest depth value for each subsection by evaluating the depth value of all 3D image data included in each respective subsection of the secondary image, determine a depth change by comparing the primary largest depth value for each subsection to the secondary largest depth value for each subsection, cluster subsections in the secondary image including a respective secondary largest depth value that is substantially similar to a respective secondary largest depth value of a subsection that corresponds to a respective depth change to create a plurality of clusters, calculate a wasted volume by multiplying a sum of respective depth values corresponding to respective clusters to an area value corresponding to each subsection, and calculate a ULD package density by subtracting the wasted volume from a filled volume of the ULD.

In a variation of this embodiment, the instructions, when executed, further cause the one or more processors to: retrieve, for each subsection in each cluster, the depth value in the primary image; store a smallest depth value for each cluster in the primary image; and calculate a wasted space value by subtracting the depth value for each subsection within each respective cluster from the smallest depth value corresponding to the respective cluster. Further in this variation, the respective depth value corresponding to the respective cluster is the wasted space value for the respective cluster, and the area value corresponding to each subsection is based on a height and a width of each subsection.

In yet another variation of this embodiment, the instructions, when executed, further cause the one or more processors to: apply a filter to the secondary image to remove pixilation from the secondary image, wherein the filter includes one or more of (i) a median filter or (ii) a Gaussian filter; and calculate the filled volume of the ULD by multiplying a fullness estimation with a known volume of the ULD.

In still another variation of this embodiment, the instructions, when executed, further cause the one or more processors to cluster subsections by applying a search-based algorithm including one or more of (i) a depth first search (DFS) or (ii) a breadth first search (BFS).

In another variation of this embodiment, the instructions, when executed, further cause the one or more processors to: capture a tertiary image featuring the ULD, wherein the tertiary image includes at least one of (i) an infrared (IR) image or (ii) a red-green-blue (RGB) image; and analyze the tertiary image to identify an erroneously clustered subsection.

In yet another variation of this embodiment, the secondary image is captured a duration D after capturing the primary image, and the instructions, when executed, further cause the one or more processors to: (a) designate the secondary image as a prior image; (b) capture a subsequent image featuring the ULD the duration D after capturing the prior image; (c) designate the subsequent image as a current image; (d) calculate the ULD package density by comparing the current image to the prior image; (e) designate the current image as the prior image; and (f) iteratively perform steps (b)-(f) until at least one of (i) the ULD package density exceeds a package density threshold or (ii) the ULD package density fails to increase between subsequent iterations of steps (b)-(f) for more than a threshold iteration count.

In yet another embodiment, the present invention is a tangible machine-readable medium comprising instructions for assessing a unit load device (ULD) package density. The instructions, when executed, cause a machine to at least: capture a primary image featuring the ULD and a secondary image featuring the ULD, wherein the primary image and the secondary image include a plurality of three-dimensional (3D) image data; segment the primary image and the secondary image into a plurality of subsections; determine a primary largest depth value for each subsection by evaluating a depth value of all 3D image data included in each respective subsection of the primary image; determine a secondary largest depth value for each subsection by evaluating the depth value of all 3D image data included in each respective subsection of the secondary image; determine a depth change by comparing the primary largest depth value for each subsection to the secondary largest depth value for each subsection; cluster subsections in the secondary image including a respective secondary largest depth value that is substantially similar to a respective secondary largest depth value of a subsection that corresponds to a respective depth change to create a plurality of clusters; calculate a wasted volume by multiplying a sum of respective depth values corresponding to respective clusters to an area value corresponding to each subsection; and calculate a ULD package density by subtracting the wasted volume from a filled volume of the ULD.

In a variation of this embodiment, the instructions, when executed, further cause the machine to at least: retrieve, for each subsection in each cluster, the depth value in the primary image; store a smallest depth value for each cluster in the primary image; and calculate a wasted space value by subtracting the depth value for each subsection within each respective cluster from the smallest depth value corresponding to the respective cluster. Further in this variation, the respective depth value corresponding to the respective cluster is the wasted space value for the respective cluster, and the area value corresponding to each subsection is based on a height and a width of each subsection.

In yet another variation of this embodiment, the instructions, when executed, further cause the machine to at least: apply a filter to the secondary image to remove pixilation from the secondary image, wherein the filter includes one or more of (i) a median filter or (ii) a Gaussian filter; and calculate the filled volume of the ULD by multiplying a fullness estimation with a known volume of the ULD.

In still another variation of this embodiment, the secondary image is captured a duration D after capturing the primary image, and the instructions, when executed, further cause the machine to at least: (a) designate the secondary image as a prior image; (b) capture a subsequent image featuring the ULD the duration D after capturing the prior image; (c) designate the subsequent image as a current image; (d) calculate the ULD package density by comparing the current image to the prior image; (e) designate the current image as the prior image; and (f) iteratively perform steps (b)-(f) until at least one of (i) the ULD package density exceeds a package density threshold or (ii) the ULD package density fails to increase between subsequent iterations of steps (b)-(f) for more than a threshold iteration count.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
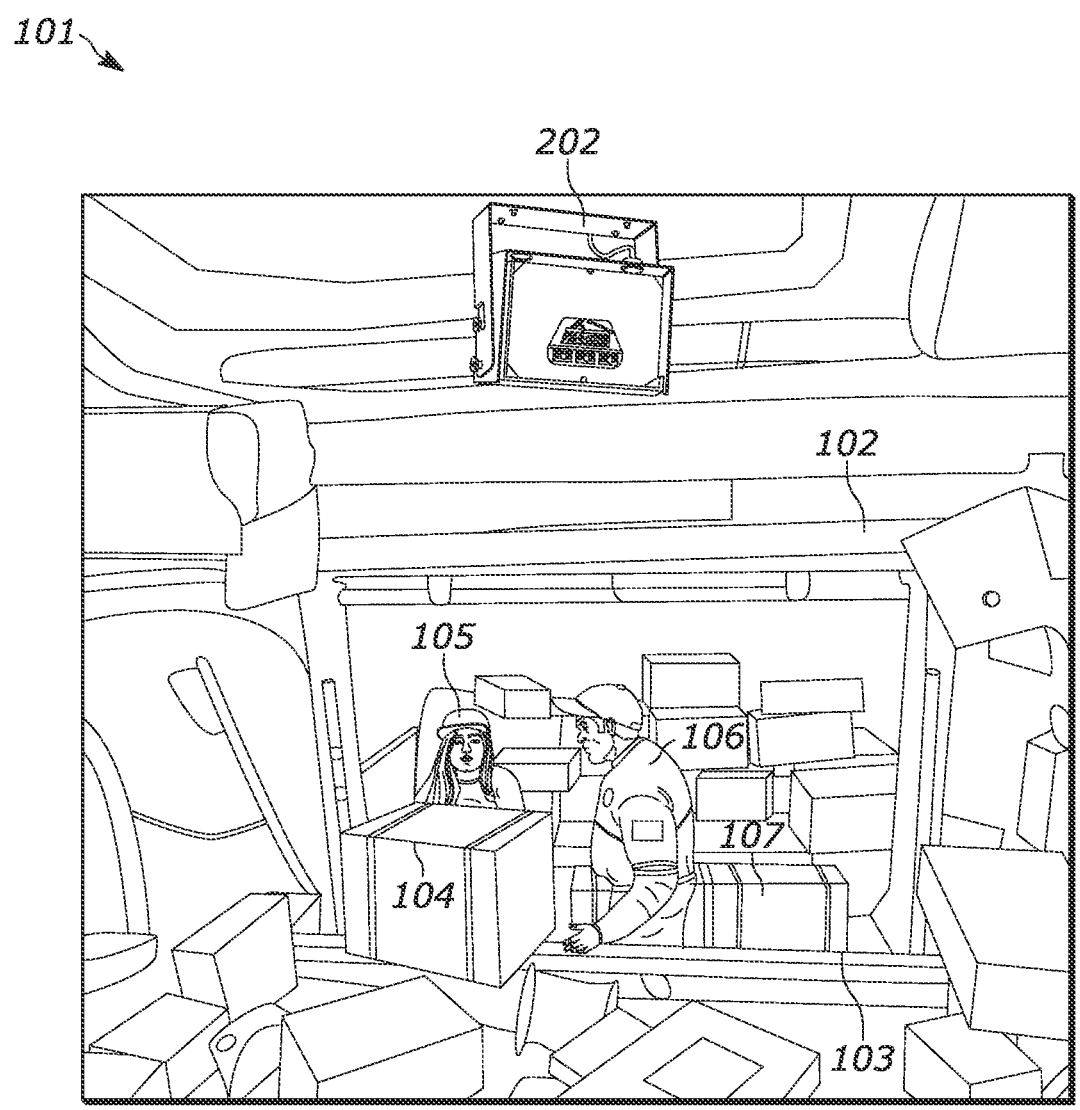
FIG. 1A is a perspective view, as seen from above, of a load point featuring a load monitoring unit (LMU) within a loading facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently detail the load status of each container for which they are responsible. Many companies incorporate imaging systems to provide this analysis (e.g., LMUs). However, these traditional imaging systems suffer from a number of drawbacks, such as being unable to effectively determine ULD package density for ULDs placed within the system's field of view (FOV). For example, package scans are presently required to give the volume of the packages loaded, which is then divided by the fullness. However, this procedure requires customer integration and does not include real-time package scans. As a result, the traditional imaging systems and methods fail to provide accurate or real-time package density determinations.

Consequently, the methods/systems of the present disclosure provide solutions to the ULD package density assessment problems associated with the traditional systems. Namely, the present disclosure provides a way to efficiently assess a ULD package density in real-time using image analysis of a three-dimensional (3D) depth image. Generally, an example method of the present disclosure includes capturing a primary image featuring the ULD and a secondary image featuring the ULD, segmenting the primary image and the secondary image into a plurality of subsections, determining depth values for each subsection, determining a depth change by comparing the depth values for each subsection, clustering subsections in the secondary image to create a plurality of clusters, calculating a wasted volume by multiplying a sum of respective depth values corresponding to respective clusters to an area value corresponding to each subsection, and calculating a ULD package density by subtracting the wasted volume from a filled volume of the ULD.

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above.

FIG. 1A is a perspective view, as seen from above, of a load point 101 within a loading facility that depicts a LMU 202 having a 3D camera (e.g., a 3D-depth camera) oriented in a direction to capture 3D image data of a shipping container, in accordance with example embodiments herein. As depicted, shipping container 102 has a shipping container type of "AMJ." Generally, a shipping container is selected from one of several differently dimensioned containers. In various embodiments, shipping containers may comprise any type of ULD. For example, a shipping container type may be of any ULD type, including, for example, any of an AMJ type, an AAD type, an AKE type, an AYY type, a SAA type, and APE type, an AAX type, or an AQF type. For ULD shipping containers, the first letter (e.g., "A" for "Certified aircraft container") indicates a specific type of ULD container, such as certified, thermal, etc., the second letter represents base size in terms of dimensions (e.g., "M" for 96×125 inch), and the third letter represents a side contour size and shape (e.g., "J" for a cube shaped ULD container having a diagonal sloping roof portion on one side only). More generally, however, a shipping container may be any aircraft-based shipping container.

The load point 101 may be a predefined search space determined based on the shipping container size, dimensions, or otherwise configuration and/or the area in which the shipping area is localized. For example, in one embodiment, the predefined search space may be determined based on ULD type, shape, or position within a general area. As shown in FIG. 1A, for example, the predefined search space is determined based on the size and dimensions of the shipping container 102 which is of type AMJ. In general, load point 101 is defined so as to completely (or at least partially) include or image the shipping container. The load point 101 may further include a frontal area 103 that generally defines a front position of the predefined search space and/or shipping container 102.

FIG. 1A additionally depicts, within load point 101, personnel or loaders 105, 106 that load packages 104, 107 into the shipping container 102. In the embodiment of FIG. 1A, shipping container 102 is being loaded by loaders 105, 106 with packages 104, 107 during a loading session. The loading session includes loading a set or group of identified packages into shipping container 102. The loaders 105, 106 and packages 104, 107, by movement through the load point 101, may generally cause occlusion and interference with the LMU 202 (as discussed for FIG. 2) capturing 3D image data, over time, of shipping container 102. Thus, as the loaders 105, 106 continually load the packages 104, 107 during the loading session, the LMU 202 may periodically capture 3D image data at a frequency sufficient to ensure occlusion caused by the loaders 105, 106 and/or packages 104, 107 does not further complicate the imaging difficulties posed by normal loading session operations.

As previously mentioned, and as illustrated in FIG. 1A, the LMU may be located at an elevated position within a loading point (e.g., load point 101) and oriented in a downward facing direction (e.g., toward the loading point floor). As a result, the LMU image sensor FOV may feature portions of, and the image sensors may capture images of, the top and front sides of a ULD. However, it is to be appreciated that the LMU may be positioned/oriented in any suitable manner to capture images of a front side, a top side, a back side, a bottom side, and/or any other side/surface of a ULD. In any event, these top and front side images may allow the LMU to perform loading analytics (e.g., package density analysis, etc.) with regard to the imaged ULD by examining the interior contents of the imaged ULD.

Figure 1B:
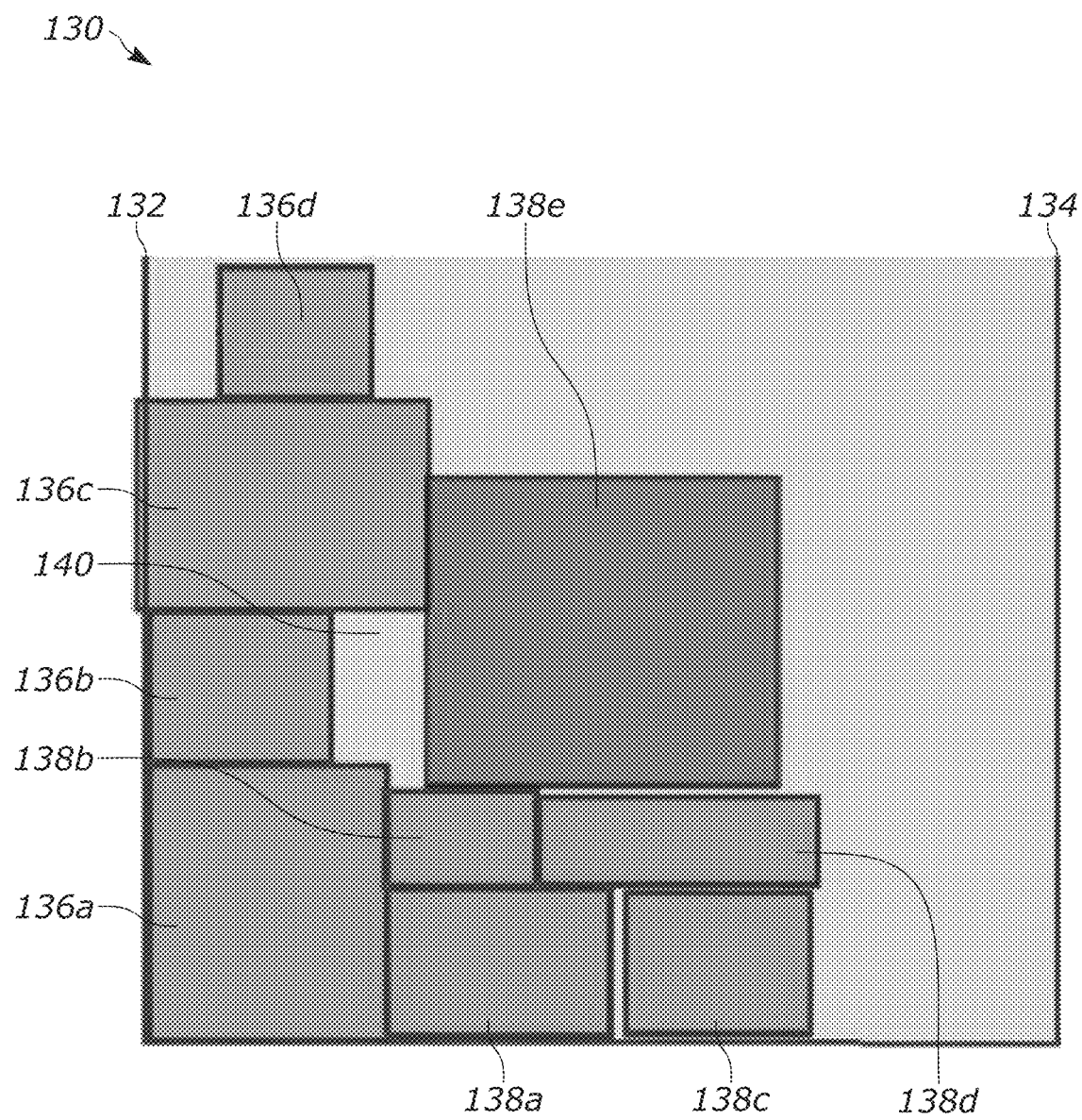
FIG. 1B is a side view of a unit load device during a loading session within the loading facility of FIG. 1A, in accordance with embodiments described herein.

For example, FIG. 1B is a side view of a unit load device 130 during a loading session within the loading facility of FIG. 1A. The ULD 130 may comprise a back wall 132 and a front face 134, within which, several packages 136a-136d, 138a-138e are stored. There may additionally be a wasted space 140 primarily between the package 138e and the package 136b. The wasted space 140 may be the result of a worker loading packages improperly or simply being unable to load each of the packages 138a-e in a manner sufficient to eliminate the wasted space 140.

In a typical scenario, a worker (e.g., loader 105, 106) may load the ULD 130 by creating a layer of packages against the back wall 132 and progressively moving toward the front face 134 of the ULD 130 in this fashion (e.g., a "typewriter" loading technique) by fully and/or partially completing each layer before beginning a subsequent layer of packages. Accordingly, a worker may load each of the packages 136a-136d into the ULD 130 first during a loading session to create a first package layer against the back wall 132. Namely, the loader may load package 136a first, package 136b second, package 136c third, and package 136d fourth. Once the first package layer is complete, the worker may proceed to load the packages 138a-e to create a second package layer within the ULD 130.

Generally speaking, most packages loaded into ULDs are cuboidal, and as a result, have flat faces. If there is a protrusion in the packages behind a newly placed package, there must be wasted space, as the newly placed package is constrained to move as far back in the ULD as the furthest forward surface of packages behind the newly placed package allows. As illustrated, a worker may be unable to push the package 138e back any further towards package 136b to eliminate or otherwise reduce the wasted space 140 because the furthest forward surface of package 136c protrudes beyond the furthest forward surface of package 136b to contact package 138e. Conventional systems are unable to identify such wasted space within ULDs during a loading session, and as a result, fail to account for the wasted space in any performed loading analytics. Accordingly, the systems and methods described further herein seek to find this wasted space 140 and thereby improve upon the conventional systems and methods for obtaining an accurate analysis of package density within a loaded ULD.

Figure 2:
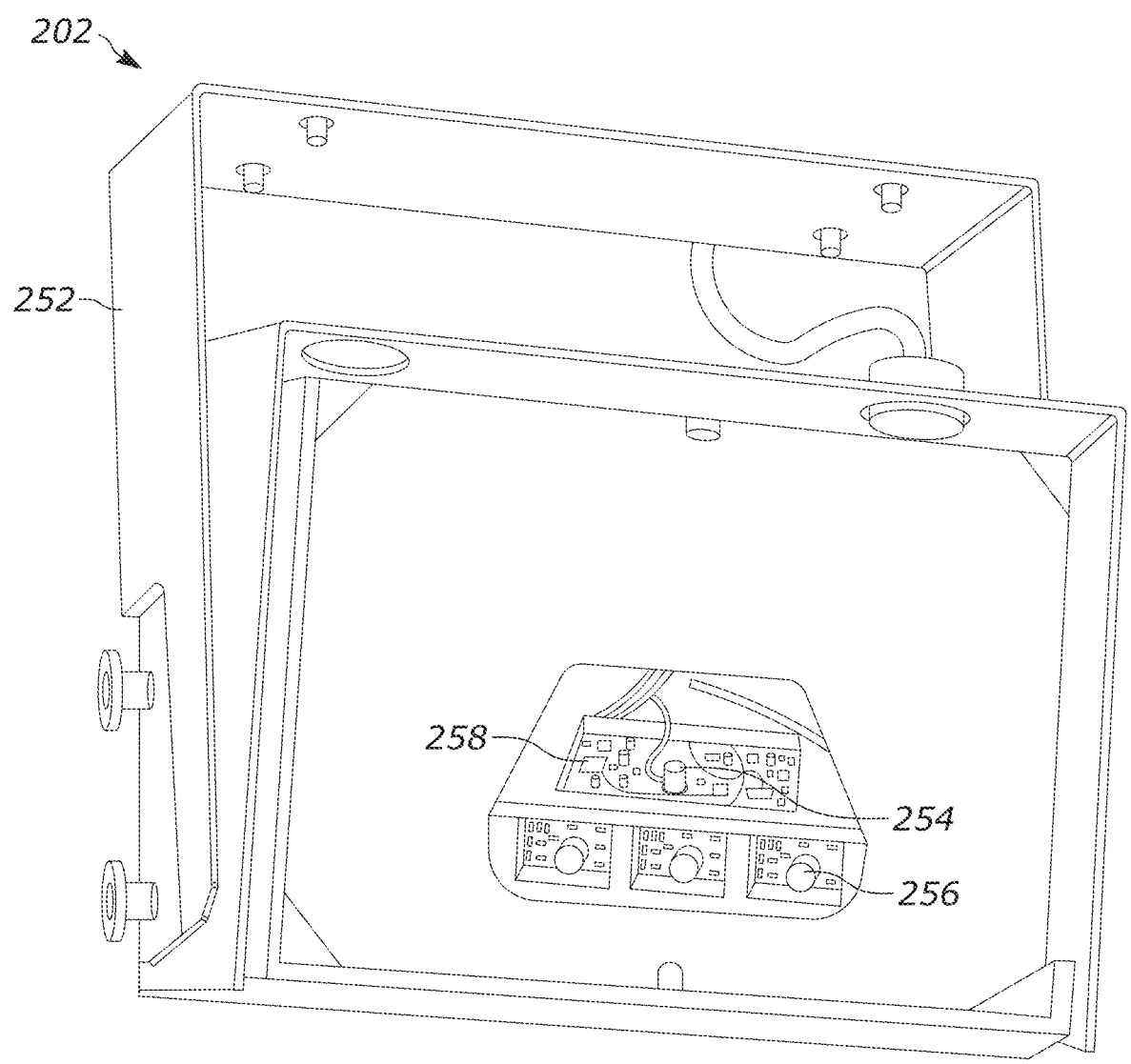
FIG. 2 is a perspective view of the LMU of FIG. 1A, in accordance with embodiments described herein.

FIG. 2 is a perspective view of the LMU 202 of FIG. 1A, in accordance with example embodiments herein. In various embodiments, LMU 202 is a mountable device. Generally, an LMU 202 comprises camera(s) and a processing board and is configured to capture data of a loading scene (e.g., a scene including space 101). LMU 202 may run container fullness estimation and other advanced analytical algorithms such as package density analysis.

LMU 202 may include a mounting bracket 252 for orienting or otherwise positioning the LMU 202 within a loading facility associated with the load point 101, as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices.

LMU 202 may include a 3D camera 254 (also referenced herein as a "Time-of-Flight (ToF) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load point 101) or objects within the predefined search area, such as boxes or packages (e.g., packages 104, 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the load point 101 and any objects, areas, or surfaces therein. The 3D camera 254 may also be configured to capture other sets of image data in addition to the 3D image data, such as grayscale image data or amplitude image data, each of which may be depth-aligned with the 3D image data.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

LMU 202 may also include a processing board 258 configured to, for example, perform container fullness estimation and other advanced analytical algorithms such as package density analysis based on images captured by the cameras 254, 256. Generally, the processing board 258 may include one or more processors and one or more computer memories for storing image data, and/or for executing apps that perform analytics or other functions as described herein.

The processing board 258 may also include transceivers and/or other components configured to communicate with external devices/servers. The processing board 258 may thus transmit and/or receive data or other signals to/from external devices/servers before, during, and/or after performing the analytical algorithms described herein.

In various embodiments, and as shown in FIG. 1A, the LMU 202 may be mounted within a loading facility and oriented in the direction of space 101 to capture 3D and/or 2D image data of shipping container 102. For example, as shown in FIGS. 1A and 1B, the LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the space 101 to determine the 3D and 2D image data. The image data may be processed by the processing board 258 of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., load point 101) are contemplated herein.

In some embodiments, for example, LMU 202 may process the 3D and 2D image data/datasets, as scanned or sensed from the 3D camera and photo-realistic camera, for use by other devices (e.g., an external server). For example, the processing board 258 of LMU 202 may process the image data or datasets captured, scanned, or sensed from load point 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a container feature assessment app that may be, for example, installed and executing on a client device, for viewing, manipulation, or otherwise interaction. In other embodiments, the image data and/or the post-scanning data may be sent to a server for storage or for further manipulation. For example, the image data and/or the post-scanning data may be sent to a server. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the container feature assessment app implemented on a client device.

Figure 3:
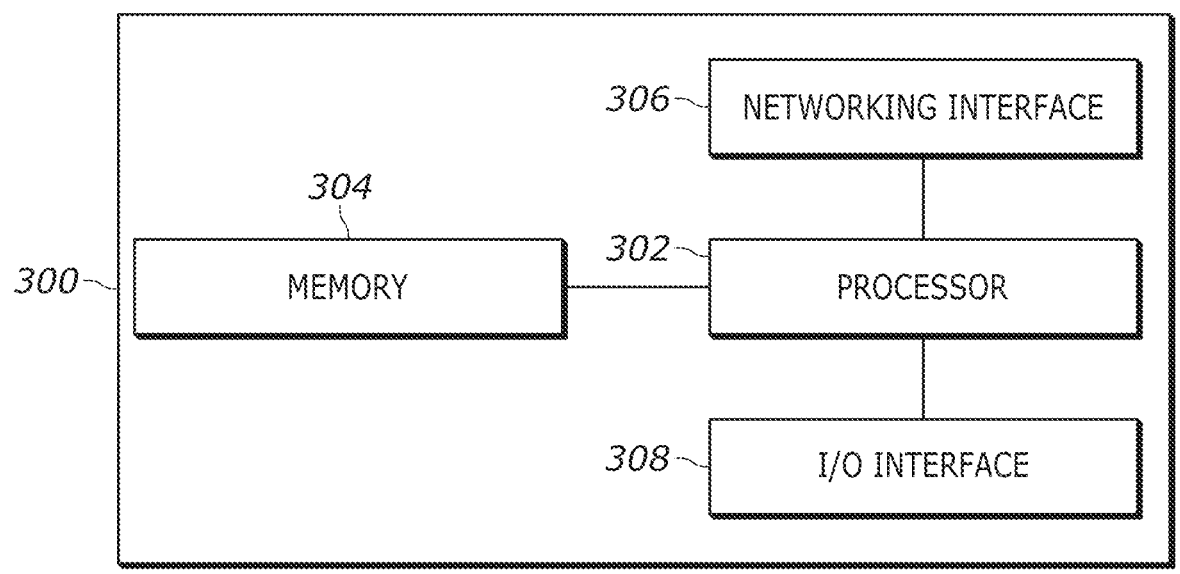
FIG. 3 is a block diagram of an example logic circuit for implementing example methods and/or operations described herein.

FIG. 3 is a block diagram representative of an example logic circuit capable of implementing, for example, one or more components of the example TMU of FIG. 2 or, more specifically, the example processing board 258 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
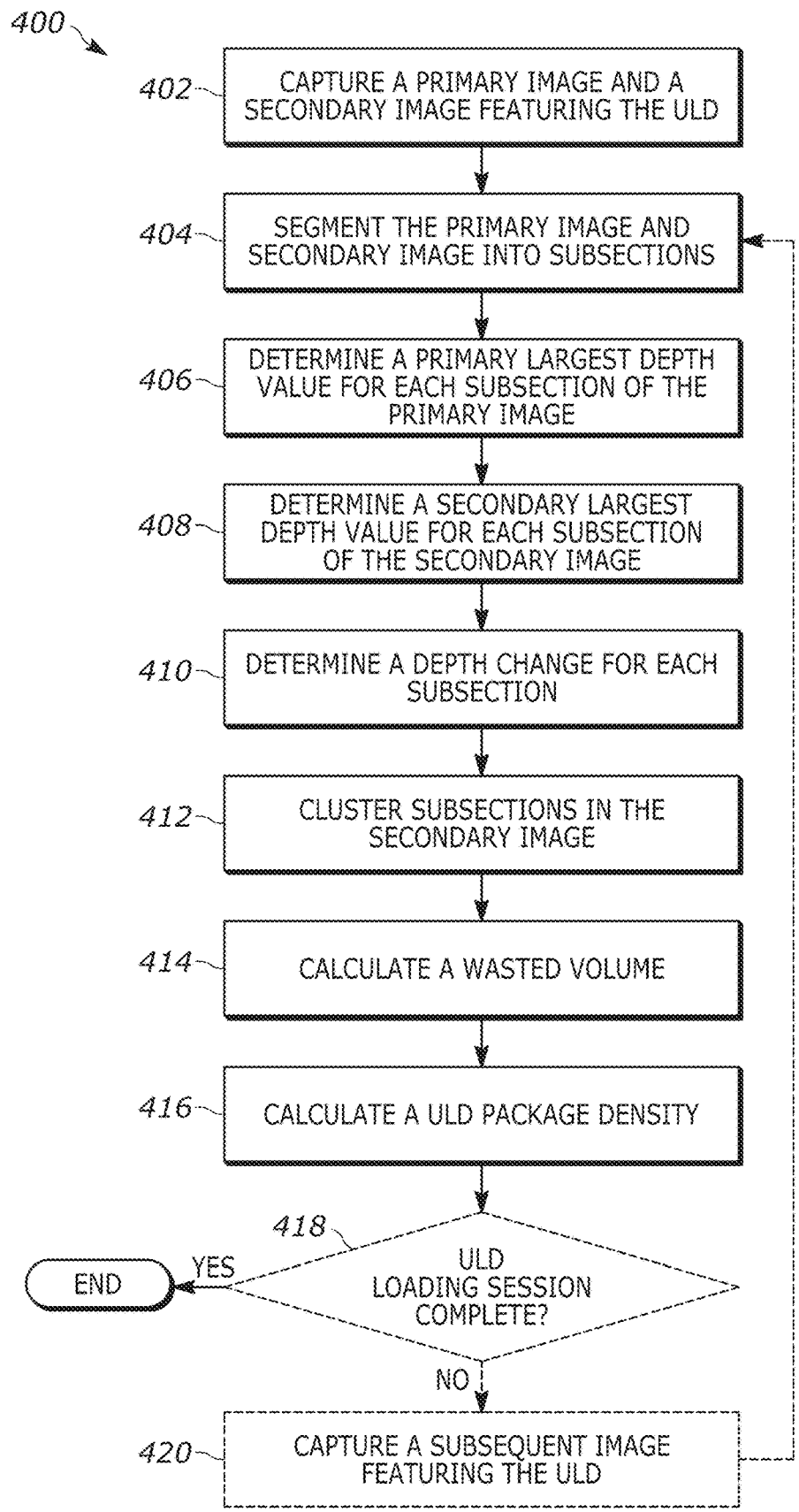
FIG. 4 is a flowchart representative of a method for assessing a ULD package density, in accordance with embodiments described herein.

FIG. 4 is a flowchart representative of a method 400 for determining a package density within a ULD, in accordance with embodiments described herein. Method 400 describes various methods for determining the package density within a ULD, and embodiments of the method 400 are discussed below in context with FIGS. 5 and 6. Generally speaking, the method 400 for determining a ULD package density includes capturing images of the ULD within a load point (e.g., load point 101), segmenting the images into subsections and clusters, and comparing depth values of the subsections/clusters to determine the ULD package density. Segmentation and clustering of the images may be discussed with additional reference to FIGS. 5 and 6, and comparing depth values to determine the ULD package density may be discussed with additional reference to FIG. 6.

The method 400 begins by capturing a primary image and a secondary image featuring the ULD (block 402). Broadly, the primary image and the secondary image may represent the load point, such that the set of image data may feature the ULD when the ULD is located within the load point (e.g., during a loading session). The primary image may represent the ULD at a first point during the load point, and the secondary image may represent the ULD at a second point during the loading session that is later than the first point during the loading session. The LMU 202 of FIG. 2 may automatically capture or receive a signal from an operator instructing the LMU 202 to capture the primary image and/or the secondary image in response to the presence of a ULD in the load point (e.g., load point 101). The LMU 202 may capture image data of the ULD using any number of cameras included in the LMU 202, such as the ToF camera 254 and/or the photo-realistic camera 256.

Block 402 may be performed by, for example, the ToF camera 254 of FIG. 2. Block 402 may be performed by, for example, the LMU 202.

The primary image and the secondary image may both include a plurality of three-dimensional image data. In embodiments, the primary image and/or the secondary image may comprise (i) a three-dimensional depth image and (ii) a red-green-blue (RGB) image. Moreover, the LMU may capture a tertiary image featuring the ULD that includes at least one of (i) an infrared (IR) image or (ii) a RGB image. As mentioned, the imaging systems of the LMU may include multiple cameras, such as the ToF camera 254 and the photo-realistic camera 256. These cameras 254, 256 may be configured to capture image data simultaneously, but the two sets of image data may be from two different perspectives due to the physical displacement between the cameras 254, 256. Accordingly, in these embodiments, the LMU may align the image data captured by the photo-realistic camera 256 (RGB image) with the image data captured by the ToF camera 254.

As mentioned, the secondary image may represent the ULD at a later point in time during a loading session with respect to the primary image. Accordingly, the secondary image may feature more packages within the ULD. In order to accurately determine the package density within the ULD, the LMU must resolve individual packages within the ULD with high-resolution. Thus, in embodiments, the LMU and/or other suitable processor may apply a filter to the secondary image to remove pixilation from the secondary image. The LMU or other suitable processor may also apply the filter to the primary image, and the filter may include one or more of (i) a median filter or (ii) a Gaussian filter.

The method 400 continues by segmenting the primary image and the secondary image into a plurality of subsections (block 404). Generally speaking, segmenting the primary image and the secondary image may include projecting a grid onto both the primary image and the secondary image, wherein the individual regions of the grid collectively define the plurality of subsections. For example, and in reference to FIG. 5, the example image 500 may represent a primary image captured of a ULD during the beginning of a loading session. The example image 500 may include pixels 502 representing the top edge of the ULD and pixels 504 representing the back wall of the ULD. The LMU or other suitable processor may then overlay a grid onto the example image 500, wherein the grid is comprised of a plurality of grid cells. A selection of grid cells is represented within the indicated portion 506 of the example image 500. Block 404 may be performed by, for example, the LMU 202.

Each grid cell within the overlaid grid may represent a predetermined dimension of the example image 500. For example, each grid cell may include one-hundred pixels or my represent a five inch by five inch region of the ULD. In any event, the size of each individual grid cell represented in the example image 500 may be significantly smaller or larger than depicted in FIG. 5. Additionally or alternatively, the grid may be comprised of individual grid cells of any shape and each individual cell may be independently sized from each other cell to predefine known regions within the example image 500.

To illustrate, the LMU may begin by overlaying the example image 500 with a grid including a plurality of rows and columns, which themselves define the plurality of grid cells. Each row in the plurality of rows may be separated from adjacent rows in the plurality of rows by a predetermined row distance, and each column in the plurality of columns may be separated from adjacent columns in the plurality of columns by a predetermined column distance. For example, each row may be separated from adjacent rows by 1 mm, and each column may be separated from adjacent columns by 1 mm. Thus, the grid on the example image 500 may include cells that are 1 mm×1 mm in dimension. Of course, the predetermined row distance and the predetermined column distance may be any suitable values, and may be different for different ULD container types. For example, full scale ULD container types may have larger predetermined row and column distances than ULD container types of different sizes (e.g., half scale ULD container types) to account for the larger amount of data likely to be present from a full scale ULD.

Moreover, each data point (e.g., pixel) in the example image 500 may include coordinate values to represent their respective positions within the example image 500. A pixel in the example image 500 may have a coordinate value of the type (x, y, z), where x is horizontal position, y is lateral position, and z is depth. Pixels with large x values may be displaced further to the left or right of the center of the camera FOV or further from the left or right side of the camera FOV than pixels with smaller x values. Pixels with large y values may be further above or below the center of the camera FOV or further from the top or bottom of the camera FOV than pixels with smaller y values. Pixels with large z values may be further away from the camera than pixels with smaller z values.

The method 400 may continue by determining a primary largest depth value for each subsection in the primary image (block 406). Generally, the LMU or other processor may analyze the depth values of each pixel within each grid cell of the overlaid grid to determine the largest depth value within each grid cell. The primary largest depth value may represent the largest depth value for a particular subsection that includes one or more grid cells. Block 406 may be performed by, for example, the LMU 202.

For example, assume each subsection includes fifty individual grid cells, each of which includes a depth value. In the Cartesian system described above, each of the fifty individual grid cells includes a z value indicative of the distance the object represented by the pixel is from the LMU. Assume, for simplicity, that forty-nine of the grid cells in a particular subsection have depth values of five, indicating that the object represented by each of the forty-nine pixels is five meters away from the LM U. Of course, the depth value may be indicated in any suitable units, such as meters, feet, inches, etc. Further assume that the fiftieth grid cell in the particular subsection has a depth value of six, indicating that the object represented by the fiftieth pixel is six meters away from the LM U. The LMU may analyze each of the fifty depth values and determine that the fiftieth grid cell has the largest depth value of the subsection. Accordingly, the LMU may assign the fiftieth grid cell depth value as the primary largest depth value, such that the primary largest depth value for the particular subsection is six.

The method 400 may continue by determining a secondary largest depth value for each subsection in the secondary image (block 408). Generally, the LMU may repeat the actions described herein with respect to determining the primary largest depth value for each subsection in the primary image to determine the secondary largest depth value for each subsection in the secondary image. Block 408 may be performed by, for example, the LMU 202.

Figure 5:
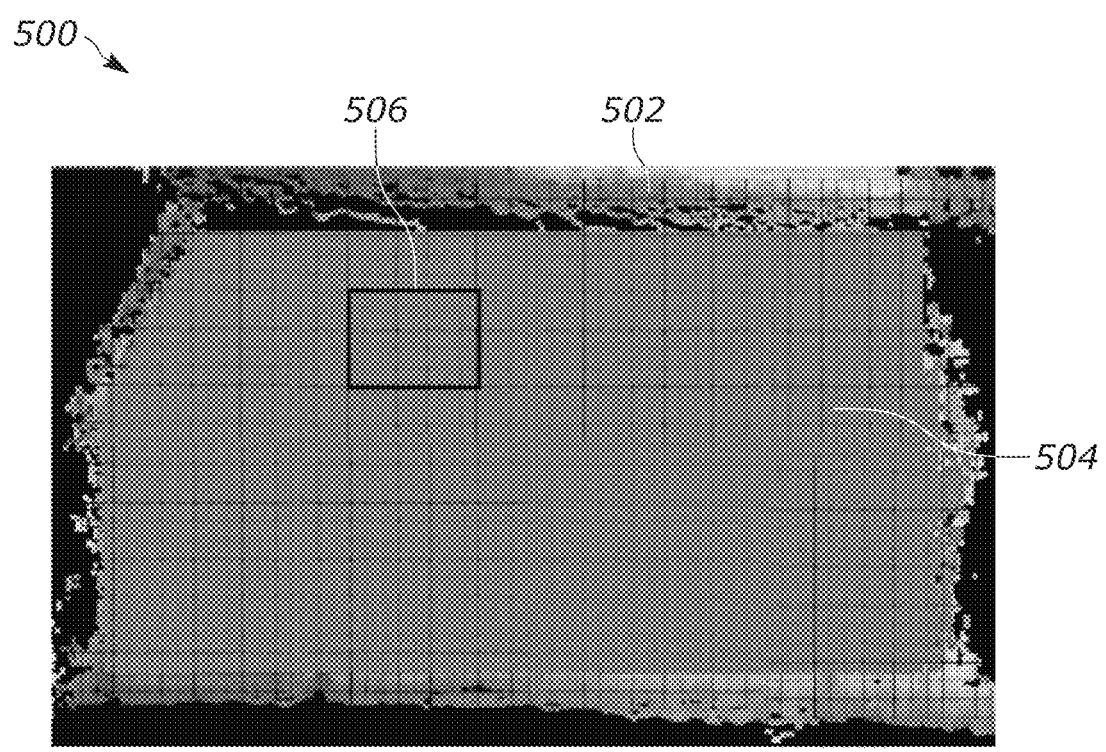
FIG. 5 illustrates a 3-D depth image of a ULD front face before a loading session including a grid overlay used to facilitate example methods and/or operations described herein.

Moreover, the LMU or other suitable processor may determine the secondary largest depth value before or after determining the primary largest depth value. For example, the LMU may capture an image of the ULD, similar to the example image 500 of FIG. 5, representative of the ULD at the beginning of a loading session. The LMU may not perform any analytics using the primary image at this point because the loading session has not commenced. However, when the LMU captures the secondary image after a duration D, there may likely be packages loaded into the ULD, and the LMU may therefore be able to begin performing analytics (e.g., fullness analytics, package density, etc.) using the secondary image. Thus, the LMU may determine the primary largest depth value from the primary image and the secondary largest depth value from the secondary image in tandem.

As mentioned, the subsections in the secondary image may be identical to the subsections in the primary image, such that a direct one-to-one comparison of the depth values for each subsection may accurately reflect changes in the largest depth value contained in each subsection between the primary image and the secondary image. For example, if the secondary largest depth value for a particular subsection is substantially different than the primary largest depth value for the particular subsection, the LMU may determine that a change in the object represented by the subsection and/or grid cell has taken place in the time interval between when the primary image and the secondary image was captured.

The method 400 may continue by determining a depth change for each subsection (block 410). Generally, the LMU or other suitable processor may compare the primary largest depth value for each subsection to the corresponding secondary largest depth value for the subsection. As an example, assume that three different subsections in the primary image have primary largest depth values of 4.7 meters, 4.9 meters, and five meters, respectively. Further assume that the same three subsections have secondary largest depth values of 4.7 meters, 4.2 meters, and 4.4 meters, respectively, as determined from the secondary image. The LMU or other suitable processor may then determine depth changes for each subsection by subtracting the secondary largest depth values from the primary largest depth values. Hence, the depth changes may be 0 meters, 0.7 meters, and 0.6 meters, respectively, for each of the subsections. The LMU may then store the depth change value for each subsection to determine subsections that may represent similar objects within the LMU FOV.

Accordingly, the method 400 may continue by clustering subsections in the secondary image (block 412). Generally, the LMU or other suitable processor may analyze the secondary largest depth values for each of the subsections along with their respective depth changes to determine which subsections include grid cell values (e.g., pixels) representative of the same object. Namely, the LMU or other suitable processor may cluster subsections in the secondary image that have a respective secondary largest depth value that is substantially similar to a respective secondary largest depth value of a subsection that corresponds to a respective depth change to create a plurality of clusters. Block 412 may be performed by, for example, the LMU 202.

For example, and again for simplicity, assume that the secondary image of a ULD includes ten subsections. Further assume that the secondary largest depth value for eight of the ten subsections is six meters and that the secondary largest depth value for the remaining two subsections is 5.3 meters, indicating that eight of the subsections contain pixel data indicative of one or more objects six meters away from the LMU at the time the secondary image was captured and that the remaining two subsections contain pixel data indicative of one or more objects 5.3 meters away from the LMU at the time the secondary image was captured. However, further assume that the depth change for eight of the ten subsections is zero meters while the depth change for two of the ten subsections is 0.7 meters. The LMU may determine that the one or more objects represented in each of the eight subsections with a zero meter depth change have not changed between the capture of the primary image and the secondary image.

Accordingly, the LMU may not cluster any of the eight subsections together because there may not be any indication that the one or more objects represented by the grid cell data in the subsections represents the same object(s) in the secondary image. For example, if the back wall of the ULD is six meters away, the LMU should not cluster the eight subsections with a secondary largest depth value of six meters because the LMU would be improperly categorizing the back wall as an "object." Doing so may cause the LMU to lose resolution during subsequent iterations of the method 400 because the LMU may be unable to determine smaller packages and other objects within the ULD if four fifths of the ULD is treated as a single cluster.

Additionally, the LMU may further determine that the one or more objects represented in the two subsections with a 0.7 meter depth change have changed between the capture of the primary image and the secondary image, and that the change may represent the same object in both subsections. For example, a package may have been placed within the ULD such that the package extended across both subsections in the LMU FOV. Accordingly, the LMU may cluster the two subsections together because their respective secondary largest depth values are substantially similar (in this case, identical), and both subsections have a depth change values that are substantially similar (in this case, identical).

Figure 6:
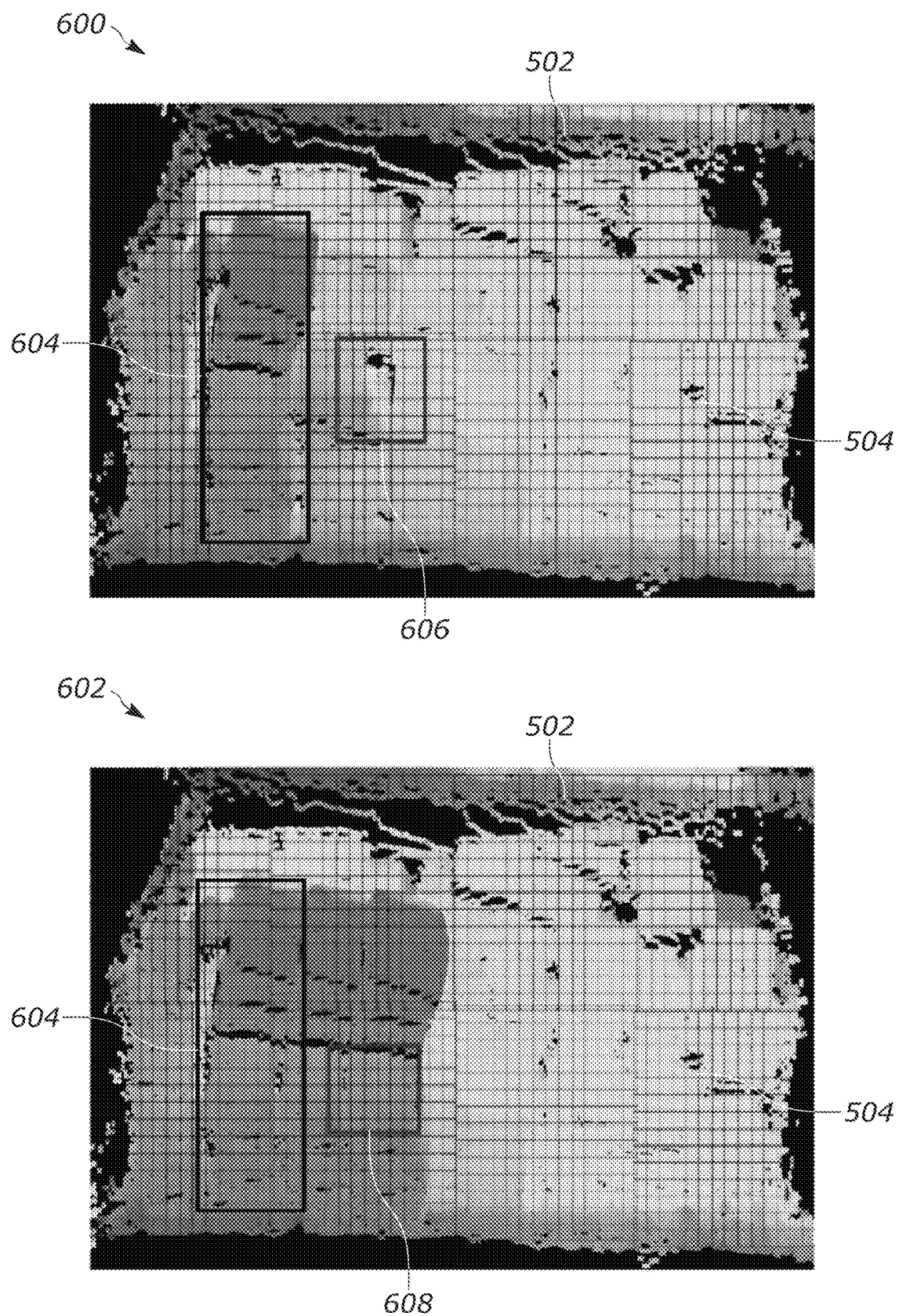
FIG. 6 illustrates successive images of the ULD front face of FIG. 5 during a loading session used to facilitate example methods and/or operations described herein.

To illustrate, and in reference to FIG. 6, the LMU may cluster subsections based upon an example primary image 600 and an example secondary image 602. The example primary image 600 may include the pixels 502 representing the top edge of the ULD, the pixels 504 representing the back wall of the ULD, a group of pixels 604 representing a stack of packages within the ULD, and a group of pixels 606 representing a wasted space portion between stacks of packages within the ULD. The example secondary image 602 may include the pixels 502 representing the top edge of the ULD, the pixels 504 representing the back wall of the ULD, the group of pixels 604 representing a stack of packages within the ULD, and a group of pixels 608 representing a newly placed package that covers the wasted space portion in the example primary image 600.

Once the newly place package is placed within the ULD, the LMU may capture the example secondary image 602 and analyze the secondary largest depth value for the subsections included in the group of pixels 608 representing the newly placed package to determine that each subsection included in the group of pixels 608 includes a substantially similar secondary largest depth value and a similar depth change from the example primary image 600. Thus, the LMU or other suitable processor may determine that the group of pixels 608 collectively corresponds to the newly placed package, and may further cluster the subsections together to thereafter represent the newly placed package by assigning each subsection within the cluster a single depth value representative of the newly place package. For example, the LMU may take the average depth value of each of the secondary largest depth values of each subsection within the cluster, or the LMU may assign the mean, the median, the mode, and/or any other suitable calculation method or combination thereof applied to each of the secondary largest depth values of each subsection within the cluster to the cluster. Moreover, and as discussed further herein, the LMU may compare the depth value of the cluster in the example secondary image 602 to the largest depth value of the cluster as determined from the example primary image 600 to determine a wasted space corresponding to the cluster.

In embodiments, clustering the subsections in the secondary image further comprises the LMU utilizing a particular searching algorithm. For example, the LMU may apply a search-based algorithm including one or more of a depth first search (DFS) algorithm, a breadth first search (BFS) algorithm, and/or any other suitable searching algorithm or any combinations thereof.

In embodiments, clustering the subsections additionally includes capturing a tertiary image featuring the ULD. The tertiary image may include at least one of an infrared (IR) image, a red-green-blue (RGB) image, a 3D depth image, and/or any other suitable image or combination thereof. In these embodiments, clustering the subsections may further include analyzing the tertiary image to identify an erroneously clustered subsection. The LMU may utilize an RGB camera (e.g., photo-realistic camera 256) to capture the tertiary image before, after, or simultaneously with the primary image capture and/or the secondary image capture. The LMU may then analyze the tertiary image to determine if previously clustered subsections have been clustered erroneously by examining whether subsections with substantially similar secondary largest depth values actually represent two distinct objects within the ULD.

For example, during a loading session, workers may place two packages in the ULD such that the front faces of both packages are substantially similarly distant from the LMU and that the two packages are contacting one another. In this scenario, the LMU may capture a secondary image and a tertiary image of the ULD, and determine that two subsections (each containing one of the two packages) have similar secondary largest depth values and depth changes. Accordingly, the LMU may cluster the two subsections containing the two packages based upon the analysis associated with the secondary image. However, the LMU may also analyze the tertiary image to determine that the two subsections, in fact, represent two distinct objects (e.g., the two distinct packages). The LMU may then separate the two subsections in accordance with the analysis associated with the tertiary image.

This tertiary image analysis yields yet another improvement over conventional technologies because it enables the LMU to determine distinct packages with the ULD and to evaluate the relative dimensions of each package. Advantageously, this may allow the LMU or other suitable processor to determine whether particular packages or other objects within the ULD may be able to fill wasted space, as determined in accordance with the method 400 described herein. For example, if the LMU determines that an object within the ULD is covering a wasted space of one square meter, and the LMU further identifies an object within the ULD that is one square meter, the LMU may generate an alert signal or other message to alert a user/operator of the wasted space within the ULD and the presence of an object sufficient to fill all or a portion of the wasted space.

The method 400 may continue by calculating a wasted volume (block 414). Generally, the LMU calculates the wasted volume by determining an amount of wasted space behind each package within a ULD. The LMU first determines how far back a package or other object may possibly have been placed within the ULD, and then determines whether there is any open space behind the package or other object despite the package or other object being placed as far back within the ULD as possible. More specifically, the LMU or other suitable processor may calculate the wasted volume by multiplying a sum of respective depth values corresponding to respective clusters to an area value corresponding to each subsection. Block 414 may be performed by, for example, the LMU 202.

The LMU may first determine a maximum depth value for each subsection in the primary image that is eventually occupied within the ULD by the package or other object. Thus, in embodiments, the LMU or other suitable processor may retrieve a depth value in the primary image for each subsection in each cluster. For example, and in reference to FIG. 6, the LMU may analyze the group of pixels 606 within the example primary image 600 that represent the cluster indicated by the group of pixels 608 to determine depth values for each pixel within the group of pixels 606.

The LMU may then store a smallest depth value for each cluster in the primary image. In this manner, the LMU may determine how far the package or other object represented by each cluster may have been pushed back into the ULD during loading. Continuing the above example, the LMU may analyze the depth values for each pixel included in the group of pixels 606 and compare each of them to determine a smallest depth value for the entire group of pixels 606. The LMU may then determine that the back side of the package or other object represented by the group of pixels 608 in the example secondary image 602 is positioned at approximately the smallest depth value determined based on the group of pixels 606 in the example primary image 600.

The LMU or other suitable processor may then calculate a wasted space value by subtracting the depth value for each subsection within each respective cluster from the smallest depth value corresponding to the respective cluster. For respective depth values that are substantially similar to the smallest depth value, the result of subtracting the smallest depth value from the respective depth values may, in some instances, be equated to zero. For example, if the smallest depth value corresponds to a pixel that is representative of a portion of a front face of a package, all other pixels included in the cluster that are representative of the front portion of the package may be considered to have the smallest depth value.

For simplicity, and in continued reference to the above example, assume that the cluster represented by the group of pixels 608 includes four subsections, and that the smallest depth value for the group of pixels 606 in the example primary image 600 is four meters. Further assume that the remaining three subsections within the group of pixels 606 have depth values of 4.5 meters. The LMU or other suitable processor may then calculate a wasted space value of 0.5 meters for all three subsections.

In embodiments, the respective depth value corresponding to the respective cluster is the wasted space value for the respective cluster, and the area value corresponding to each subsection is based on a height and a width of each subsection. As previously mentioned, each subsection may have a predetermined, uniform dimension, such that the area value for any particular subsection is the same for every other subsection. Of course, the subsections may be non-uniformly dimensioned, and the dimension for each subsection may be stored in memory (e.g., memory 304). In any event, the LMU may calculate the wasted volume in accordance with the equation:

$$v(c) = \sum_{i=1}^{n} l_i \cdot a_i \quad (1)$$

where v is the wasted volume of a cluster c, i is a respective subsection within the cluster c, n is the total number of subsections within the cluster c, $I_i$ is the wasted space associated with the respective subsection, and $a_i$ is the area of the respective subsection. Namely, the wasted volume of a cluster c is calculated by summing over the product of the wasted space of a respective subsection $I_i$ and the area of the respective subsection $a_i$ for each respective subsection i within the cluster c.

To continue the above example, assume that each subsection in the cluster represented by the group of pixels 608 has an area of 0.04 square meters. Thus, the LMU or other suitable processor may calculate the wasted volume in accordance with equation (1), and determine that the wasted volume of the cluster represented by the group of pixels 608 is equivalent to 0.06 cubic meters.

The method 400 may continue by calculating a ULD package density (block 416). Broadly speaking, the LMU or other suitable processor may calculate the ULD package density by subtracting the wasted volume calculated above in accordance with equation (1) from a filled volume of the ULD. The LMU or other suitable processor may obtain and/or otherwise calculate the filled volume of the ULD by first evaluating the fullness of the ULD from existing fullness algorithms. Such algorithms generally report the fullness of the ULD as a percentage of the container. For example, a conventional fullness algorithm executed by the LMU or other suitable processor may report that the presently imaged container is forty-five percent full, ten percent full, one-hundred percent full, and/or any other suitable percentage full. Block 416 may be performed by, for example, the LMU 202.

The LMU or other suitable processor may then multiply the fullness by an overall known volume of the ULD to obtain a filled volume of the ULD. The overall known volume of the ULD may be stored in and obtained from memory (e.g., memory 304), and may be retrieved by the LMU or other suitable processor after an user/operator scans the ULD prior to the loading session. Additionally or alternatively, the LMU may automatically determine the ULD type based upon a captured image featuring the ULD (e.g., primary image, secondary image, tertiary image, etc.). Regardless, the LMU may then subtract the wasted volume calculated above in accordance with equation (1) from the filled volume to yield the package density.

The method 400 may then optionally continue by determining whether the ULD loading session is complete (optional block 418). Generally, the LMU or other suitable processor may determine when the ULD loading session is complete based upon an input received from a user/operator indicating the completion of the loading session, based upon image analysis of the ULD interior, or based upon image analysis indicating the absence of the ULD. For example, the LMU or other suitable processor may retrieve or otherwise obtain a fullness threshold corresponding to the ULD that indicates a fullness percentage of the ULD, above which, the loading session is considered complete. As another example, the LMU or other suitable processor may retrieve or otherwise obtain a package density threshold corresponding to the ULD that indicates a package density of the ULD, above which, the loading session is considered complete. Optional block 418 may be performed by, for example, the LMU 202.

To illustrate, the fullness threshold may be 90%, such that if the LMU or other suitable processor determines that the fullness of the ULD reaches or exceeds 90%, the LMU or other suitable processor may further determine that the loading session is complete. Accordingly, if the LMU or other suitable processor determines that the loading session is complete (YES branch of optional block 418), then the method 400 may end. Alternatively, if the LMU or other suitable processor determines that the loading session is not complete (NO branch of optional block 418), then the method 400 may proceed to optional block 420.

Accordingly, the method 400 may optionally continue by capturing a subsequent image featuring the ULD (optional block 420). Generally speaking, if the LMU or other suitable processor determines that the ULD loading session is not complete, the LMU may capture a subsequent image of the ULD and return to block 404 to re-iterate the actions described herein with respect to the example method 400, utilizing the secondary image of the prior iteration and the subsequent image captured at optional block 420. Moreover, the LMU or other suitable processor may iteratively perform the actions described with respect to the example method 400 until the LMU or other suitable processor determines that the ULD loading session is complete, as described herein. Accordingly, with each iteration of the actions of the example method 400, the LMU or other suitable processor may keep a running tally or sum of the wasted volume within the ULD, such that once the LMU determines that the ULD loading session is complete, the LMU may report, store, and/or otherwise utilize the most recent determination of the ULD package density as the final ULD package density. Optional block 420 may be performed by, for example, the LMU 202.

For example, assume that the LMU captures the secondary image a duration D after capturing the primary image. At optional block 420, the LMU may designate the secondary image as a prior image and capture the subsequent image featuring the ULD the duration D after capturing the prior image. The LMU may then also designate the subsequent image as a current image. Thereafter, the example method 400 may proceed back to block 404, and the LMU will proceed through the actions of the example method 400 described herein so that the LMU may calculate the ULD package density by comparing the current image to the prior image.

Continuing this example, the LMU may then again determine whether the ULD loading session is complete at optional block 418, and if not, the LMU or other suitable processor may designate the current image as the prior image and iteratively perform the above-mentioned actions. The LMU may iteratively perform such actions until, for example, the ULD package density exceeds a package density threshold, the ULD package density fails to increase between subsequent iterations of steps for more than a threshold iteration count, the fullness of the ULD exceeds a fullness threshold, and/or any other suitable metric or combination thereof is satisfied. Thus, it is to be understood that the LMU may perform the actions described with respect to optional blocks 418 and 420 after each performance of the actions associated with the method 400.

Additionally, it is to be understood that each of the actions described in the method 400 may be performed in any order, number of times, or any other combination(s) therein suitable to determine the ULD package density. For example, some or all of the blocks of the method 400 may be fully performed once, multiple times, or not at all.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for assessing a unit load device (ULD) package density, comprising:
   capturing a primary image featuring the ULD and a secondary image featuring the ULD, wherein the primary image and the secondary image include a plurality of three-dimensional (3D) image data;
   segmenting the primary image and the secondary image into a plurality of subsections;
   determining a primary largest depth value for each subsection by evaluating a depth value of all 3D image data included in each respective subsection of the primary image;
   determining a secondary largest depth value for each subsection by evaluating the depth value of all 3D image data included in each respective subsection of the secondary image;
   determining a depth change for each subsection by comparing the primary largest depth value for said each subsection to the secondary largest depth value for the respective subsection;
   clustering subsections in the secondary image including a respective secondary largest depth value that is substantially similar to a respective secondary largest depth value of a subsection that corresponds to a respective depth change to create a plurality of clusters;
   calculating a wasted volume by summing cluster wasted volumes of all clusters, wherein the cluster wasted volume of a cluster is the sum of the products of the respective wasted space values and the respective area values of all subsections in said cluster;
   calculating a ULD package density by subtracting the wasted volume from a filled volume of the ULD.

2. The method of claim 1, wherein the wasted space value for a subsection in a cluster created in the secondary image is the absolute difference between the smallest depth value for the corresponding cluster of said cluster in the primary image and the largest depth value of the corresponding subsection of said subsection in the primary image.

3. The method of claim 2, wherein the area value corresponding to each subsection is based on a height and a width of said each subsection.

4. The method of claim 1, further comprising:
   applying a filter to the secondary image to remove pixilation from the secondary image, wherein the filter includes one or more of (i) a median filter or (ii) a Gaussian filter.

5. The method of claim 1, wherein clustering subsections further comprises applying a search-based algorithm including one or more of (i) a depth first search (DFS) or (ii) a breadth first search (BFS).

6. The method of claim 1, further comprising:
   capturing a tertiary image featuring the ULD, wherein the tertiary image includes at least one of (i) an infrared (IR) image or (ii) a red-green-blue (RGB) image; and
   analyzing the tertiary image to identify an erroneously clustered subsection.

7. The method of claim 1, wherein the secondary image is captured a duration D after capturing the primary image, and the method further comprises:
   (a) designating the secondary image as a prior image;
   (b) capturing a subsequent image featuring the ULD the duration D after capturing the prior image;
   (c) designating the subsequent image as a current image;
   (d) calculating the ULD package density by comparing the current image to the prior image;
   (e) designating the current image as the prior image; and
   (f) iteratively performing steps (b)-(f) until at least one of (i) the ULD package density exceeds a package density threshold or (ii) the ULD package density fails to increase between subsequent iterations of steps (b)-(f) for more than a threshold iteration count.

8. The method of claim 1, further comprising:
   calculating the filled volume of the ULD by multiplying a fullness estimation with a known volume of the ULD.

9. A system for assessing a unit load device (ULD) package density, comprising:
   a housing;
   an imaging assembly at least partially within the housing and configured to capture a primary image featuring the ULD and a secondary image featuring the ULD, wherein the primary image and the secondary image include a plurality of three-dimensional (3D) image data;
   one or more processors; and
   a non-transitory computer-readable memory coupled to the imaging assembly and the one or more processors, the memory storing instructions thereon that, when executed by the one or more processors, cause the one or more processors to:
   segment the primary image and the secondary image into a plurality of subsections;
   determine a primary largest depth value for each subsection by evaluating a depth value of all 3D image data included in each respective subsection of the primary image;
   determine a secondary largest depth value for each subsection by evaluating the depth value of all 3D image data included in each respective subsection of the secondary image;
   determine a depth change for each subsection by comparing the primary largest depth value for said each subsection to the secondary largest depth value for the respective subsection;
   cluster subsections in the secondary image including a respective secondary largest depth value that is substantially similar to a respective secondary largest depth value of a subsection that corresponds to a respective depth change to create a plurality of clusters;
   calculate a wasted volume by summing cluster wasted volumes of all clusters, wherein the cluster wasted volume of a cluster is the sum of the products of the respective wasted space values and the respective area values of all subsections in said cluster;
   calculate a ULD package density by subtracting the wasted volume from a filled volume of the ULD.

10. The system of claim 9, wherein the wasted space value for a subsection in a cluster created in the secondary image is the absolute difference between the smallest depth value for the corresponding cluster of said cluster in the primary image and the largest depth value of the corresponding subsection of said subsection in the primary image.

11. The system of claim 10, wherein the area value corresponding to each subsection is based on a height and a width of said each subsection.

12. The system of claim 9, wherein the instructions, when executed, further cause the one or more processors to:
apply a filter to the secondary image to remove pixilation from the secondary image, wherein the filter includes one or more of (i) a median filter or (ii) a Gaussian filter; and
calculate the filled volume of the ULD by multiplying a fullness estimation with a known volume of the ULD.

13. The system of claim 9, wherein the instructions, when executed, further cause the one or more processors to cluster subsections by applying a search-based algorithm including one or more of (i) a depth first search (DFS) or (ii) a breadth first search (BFS).

14. The system of claim 9, wherein the instructions, when executed, further cause the one or more processors to:
capture a tertiary image featuring the ULD, wherein the tertiary image includes at least one of (i) an infrared (IR) image or (ii) a red-green-blue (RGB) image; and
analyze the tertiary image to identify an erroneously clustered subsection.

15. The system of claim 9, wherein the secondary image is captured a duration D after capturing the primary image, and the instructions, when executed, further cause the one or more processors to:
(a) designate the secondary image as a prior image;
(b) capture a subsequent image featuring the ULD the duration D after capturing the prior image;
(c) designate the subsequent image as a current image;
(d) calculate the ULD package density by comparing the current image to the prior image;
(e) designate the current image as the prior image; and
(f) iteratively perform steps (b)-(f) until at least one of (i) the ULD package density exceeds a package density threshold or (ii) the ULD package density fails to increase between subsequent iterations of steps (b)-(f) for more than a threshold iteration count.

16. A tangible machine-readable medium comprising instructions for assessing a unit load device (ULD) package density that, when executed, cause a machine to at least:
capture a primary image featuring the ULD and a secondary image featuring the ULD, wherein the primary image and the secondary image include a plurality of three-dimensional (3D) image data;
segment the primary image and the secondary image into a plurality of subsections;
determine a primary largest depth value for each subsection by evaluating a depth value of all 3D image data included in each respective subsection of the primary image;
determine a secondary largest depth value for each subsection by evaluating the depth value of all 3D image data included in each respective subsection of the secondary image;
determine a depth change for each subsection by comparing the primary largest depth value for said each subsection to the secondary largest depth value for the respective subsection;
cluster subsections in the secondary image including a respective secondary largest depth value that is substantially similar to a respective secondary largest depth value of a subsection that corresponds to a respective depth change to create a plurality of clusters;
calculate a wasted volume by summing cluster wasted volumes of all clusters, wherein the cluster wasted volume of a cluster is the sum of the products of the respective wasted space values and the respective area values of all subsections in said cluster;
calculate a ULD package density by subtracting the wasted volume from a filled volume of the ULD.

17. The tangible machine-readable medium of claim 16, wherein the wasted space value for a subsection in a cluster created in the secondary image is the absolute difference between the smallest depth value for the corresponding cluster of said cluster in the primary image and the largest depth value of the corresponding subsection of said subsection in the primary image.

18. The tangible machine-readable medium of claim 17, wherein the area value corresponding to each subsection is based on a height and a width of said each subsection.

19. The tangible machine-readable medium of claim 16, wherein the instructions, when executed, further cause the machine to at least:
apply a filter to the secondary image to remove pixilation from the secondary image, wherein the filter includes one or more of (i) a median filter or (ii) a Gaussian filter; and
calculate the filled volume of the ULD by multiplying a fullness estimation with a known volume of the ULD.

20. The tangible machine-readable medium of claim 16, wherein the secondary image is captured a duration D after capturing the primary image, and the instructions, when executed, further cause the machine to at least:
(a) designate the secondary image as a prior image;
(b) capture a subsequent image featuring the ULD the duration D after capturing the prior image;
(c) designate the subsequent image as a current image;
(d) calculate the ULD package density by comparing the current image to the prior image;
(e) designate the current image as the prior image; and
(f) iteratively perform steps (b)-(f) until at least one of (i) the ULD package density exceeds a package density threshold or (ii) the ULD package density fails to increase between subsequent iterations of steps (b)-(f) for more than a threshold iteration count.

* * * * *